United States Patent [19]

Brindöpke et al.

[11] Patent Number: 5,159,024

[45] Date of Patent: * Oct. 27, 1992

[54] CURING PRODUCT BASED ON OLEFINICALLY UNSATURATED COMPOUNDS AND HYDROGEN-ACTIVE COMPOUNDS, A PROCESS FOR ITS PREPARATION, AND TWO-COMPONENT LACQUERS BASED THEREON

[75] Inventors: Gerhard Brindöpke, Frankfurt am Main; Gerd Walz, Wiesbaden, both of Fed. Rep. of Germany

[73] Assignee: Hoechst AG, Fed. Rep. of Germany

[ * ] Notice: The portion of the term of this patent subsequent to Mar. 27, 2007 has been disclaimed.

[21] Appl. No.: 932,635

[22] Filed: Nov. 19, 1986

[30] Foreign Application Priority Data

Nov. 21, 1985 [DE] Fed. Rep. of Germany ....... 3541140

[51] Int. Cl.$^5$ ................................................ C08F 8/30
[52] U.S. Cl. .................................. 525/301; 525/302; 525/426; 525/530; 525/531; 528/45
[58] Field of Search ............... 525/301, 302, 426, 530, 525/531; 528/45

[56] References Cited

U.S. PATENT DOCUMENTS

| | | | |
|---|---|---|---|
| 3,773,729 | 11/1973 | Wakimoto et al. | 525/440 |
| 4,332,965 | 1/1982 | Dalibor | 528/45 |
| 4,373,081 | 2/1983 | Nachtkamp et al. | 528/45 |

*Primary Examiner*—Bernard Lipman
*Attorney, Agent, or Firm*—Bierman and Muserlian

[57] ABSTRACT

Curing product based on

A) compounds having at least two $R^1R^2C=CR^3-X$ groups (I) and

B) compounds having methanetricarboxamide units of the formula

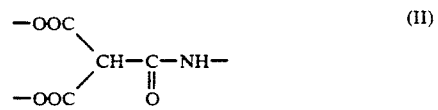

(II)

these compounds B) containing at least two groups having active H atoms of the type

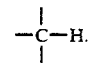

In order to prepare this curing product, the compounds A) and B) of an oligomeric and/or polymeric reaction product are reacted in the presence of at least one catalyst. The mixtures of A) and B) can be used as two-component lacquers on their own or together with customary additives.

9 Claims, No Drawings

CURING PRODUCT BASED ON OLEFINICALLY UNSATURATED COMPOUNDS AND HYDROGEN-ACTIVE COMPOUNDS, A PROCESS FOR ITS PREPARATION, AND TWO-COMPONENT LACQUERS BASED THEREON

It is known to react unsaturated compounds, such as cinnamic acid esters, with H-active compounds, for example malonic acid ester or acetoacetic ester, by Michael addition with the formation of substituted compounds, for example substituted malonic acid esters (Krauch-Kunz "Namensreaktionen der organischen Chemie" ["Named Reactions of Organic Chemistry"] 5th edition 1976, page 42).

It is also known to use an acrylic resin containing OH groups or an acrylic resin modified with ε-caprolactone mixed with polyisocyanates as a two-component lacquer (German Patent Specifications Nos. 3,005,945, 3,027,776 and 3,148,022). A further publication describes the reaction of acrylate copolymers containing epoxide groups with a partially masked isocyanate and the use of the reaction product as a lacquer binder (German Offenlegungsschrift 3,130,545).

The known products have in part proved suitable. Attempts have, however, already been made to prepare products which cause less environmental pollution, by starting from systems not containing free isocyanate.

Thus an acrylic resin containing oxazolidine which makes use of water or atmospheric moisture as the curing agent is described in another publication (European Published Specification 34,720). This system has the disadvantage that the cured surface acts against deeper penetration of water into the lower layers of the coating and thus prevents complete curing throughout the whole thickness of the layer.

A two-component system which reacts without isocyanate is also known. This is composed of an acrylic resin containing epoxide groups which can be cured by means of another acrylic resin containing tertiary amino groups. In the case of the product prepared by this process, however, the excessively low degree of crosslinking results in inadequate resistance to chemicals, so that the coatings prepared by means of this system are only suitable for a limited field of use.

The invention is therefore based on the object of developing a crosslinking principle which does not have the disadvantages described above.

The invention relates to a curing product based on
A) compounds having at least two $R^1R^2C=CR^313$ X groups (I) and
B) compounds having methanetricarboxamide units of the formula

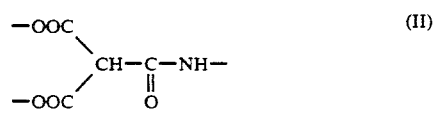
(II)

these compounds B) containing at least two groups having active H-atoms of the type

and, in formula (I),
X denoting —CO,
$R^1$ being hydrogen or a hydrocarbon radical, preferably an alkyl radical having 1 to 10, preferably 1 to 4, carbon atoms,
$R^2$ representing hydrogen, a hydrocarbon radical, preferably an alkyl radical having 1 to 10, preferably 1 to 4, carbon atoms, an ester group containing the radical $R^4$ of a monohydric alcohol having up to 12 carbon atoms, —CN, —$NO_2$ or a CO—NH—$R^1$— or CO—$R^1$— group, and the
$R^3$ having the same meaning as the $R^2$ and herewith being identical or different.

If $R^1$ and, if appropriate, also $R^2$ and $R^3$ represent a hydrocarbon radical, the latter can be, for example, a branched or unbranched alkyl radical which can optionally also contain hetero-atoms such as O or NH. Alternatively, this hydrocarbon radical can be a substituted or unsubstituted cycloalkyl radical having 6 to 10 Carbon atoms or a, preferably unsubstituted, aromatic radical having 6 to 10 carbon atoms, such as phenyl, benzyl or naphthyl.

The grouping

in formula (II) is derived from a reaction product of a monoisocyanate or polyisocyanate with a malonic acid derivative. This has the advantage that components are employed which contain no toxic constituents and which can therefore be used without special precautionary measures.

Although in the reaction of compounds A) having in each case two groups of the formula (I) with compounds B) having two units of the formula (II), even if each of the latter only contains one acid H atom, it would be expected, by virtue of the bifunctionality on both sides, that only a chain lengthening would take place in this reaction, surprisingly, cured products are obtained. The active groups of the compounds A) and B) can also be present in a single molecule, so that systems are formed which can be cured by intermolecular crosslinking and are self-crosslinking.

If it is desired to have a higher reactivity and hence a greater crosslinking of the product, it can be advantageous to follow a procedure in which three of more groups of the type (I) and/or units of the type (III) are present in at least one of the compounds A) or B).

The compounds A) which are employed in accordance with the invention contain at least two $R^1R^2C=CR^3$—X groups which are indirectly attached to one another. A suitable indirect linkage in this case is, for example, a hydrocarbon radical, but preferably the radical of a polyhydric alcohol or a polyacidic amine. This indirect linkage can also be a part of the chain of an oligomer and/or polymer i.e. the groups (I) can be present in the side chains of the main chain of the oligomer or polymer or these groups can form side chains. If the groups (I) are present in an oligomer or polymer, that is to say if the compound A) is an oligomer or polymer, the quantity of groups (I) is generally sufficiently large for the C=C equivalent weight to be between 50 and 1800, preferably between 200 and 1200.

In accordance with one embodiment of the invention, the radical $R^1R^2C=CR^3-X$ (I), in which $R^1$, $R^2$ and $R^3$ each have the abovementioned meaning, can be derived from a monounsaturated or polyunsaturated carboxylic acid which is not more than dibasic, for example a monocarboxylic and/or dicarboxylic acid, having 2 to 10, preferably 3 to 6, carbon atoms, such as cinnamic acid, crotonic acid, citraconic acid or the anhydride thereof, mesaconic acid, fumaric acid, dehydrolevulinic acid or sorbic acid, but preferably acrylic acid, methacrylic acid and/or maleic acid or the anhydride thereof, and also from unsaturated ketones, such as divinyl ketone or dibenzalacetone; and also from unsaturated nitriles, such as maleic acid mononitrile-monoesters of polyhydric alcohols, from cyanoacrylic acid esters of the formula $H_2C=C(CN)-COOR$, from nitrites of the formula $ROOC-R^3C=CH-NO_2$, from alkylidenemalonic acid esters of the formula $ROOC-C(COOR^4)=CR^1R^2$ (for $R^4$ see above), or alkylideneacetoacetic esters of the formula $ROOC-C(-CO-CH_3)=CR^1R^2$ or the corresponding nitriles, R in the above formulae being the radical of a polyhydric alcohol and $R^1$ and $R^2$ being preferably hydrogen or alkyl having 1 to 4 carbon atoms. In general, these radicals are present attached in the form of an ester or amide. They can be attached to the radical of a polyhydric alcohol, a compound having NH groups, such as a polyamine, polyamide or polyiminoamide, or of a polyhydric phenol, for example bisphenol A, resorcinol or hydroquinone, preferably an oligomer and/or polymer. Thus the compound A) can be derived, for example, from saturated and/or unsaturated polyethers or polyesters containing OH groups, for example those based on maleic acid, phthalic acid and diols; copolymers containing OH groups which have been prepared by copolymerizing hydroxyalkyl compounds of acrylic or methacrylic acid having 1 to 10 carbon atoms in the alkyl group with phenyl-aromatic compounds and, if appropriate, further copolymerizable monomers, are also suitable for this purpose. In general, the resins have OH numbers from 40 to 250, preferably 60 to 200. Examples of hydroxalkyl compounds are hydroxyethyl (meth)acrylate, the various corresponding propyl, butyl or hexyl compounds or the 2-hydroxyalkyl esters obtained by reacting epoxide compounds with acrylic or methacrylic acid. Phenyl-aromatic compounds which can be employed are α-methylstyrene, vinylstyrene or vinyltoluene, but preferably styrene. Examples of further copolymerizable monomers are alkyl esters having 1 to 10 carbon atoms in the alkyl group of α,β-ethylenically unsaturated monocarboxylic or dicarboxylic acids, such as acrylic acid, methacrylic acid, maleic acid, fumaric acid or itaconic acid or the amides and nitriles of the said acids. Suitable starting compounds for the compound A) are also aliphatic or aromatic epoxide resins, optionally containing OH groups, for example copolymers which contain epoxide groups and which have been obtained by copolymerizing the monomers mentioned above with glycidyl (meth)acrylate and which, in general, contain 1 to 10, preferably 2 to 7, % of epoxide oxygen, and also epoxide resins based on diphenylolpropane and/or diphenylolmethane, hydantoin and/or amine resins. In the case of the epoxide resins, the radical (I) which is attached in the manner of an ester can be formed, for example, by an addition reaction of acrylic or methacrylic acid with the epoxide group.

Examples of polyhydric alcohols which have been mentioned as starting substances for the component A) are alkanediols and alkanetriols, such as ethanediol, the various propanediols, butanediols, pentanediols, hexanediols or octanediols or homologs thereof, the corresponding oligomeric ethers and also glycerol, trimethylolethane or trimethylolpropane, hexanetriol, pentaerythritol, dipentaerythritol, sorbitol, polyvinyl alcohol or the like.

Alkylenediamines and oligomers thereof, such as ethylenediamine, propylenediamine, butylenediamine, diethylenetriamine, tetramines and higher homologs of these amines, and also aminoalcohols, such as diethanolamine or the like, are mentioned as examples of starting compounds, containing NH groups, for the compounds A). Suitable examples of amines are also aminocarboxylic acid esters of polyhydric alcohols, examples of compounds having NH groups are acrylic or methacrylic acid polyamides, and also polyurethanes, for example polyisocyanates which have been masked in the form of polyurethane groups, as well as those which are obtained by reacting hydroxyethyl acrylate with polyisocyanates, amine resins, such as methylolmelamines, preferably hexamethylolmelamine, and urea resins, the radical (I) containing the grouping —CO— being attached to the amine groups of these compounds in the form of an amide. If these amine compounds have OH groups or alkylol groups, it is also possible for the radical (I) to be attached to these resins directly via an ester group or indirectly via an ether group. For the ether linkage of the radical (I) it is therefore possible to use as starting material a hydroxyalkyl ester or a hydroxyalkylamide of an unsaturated acid, such as acrylic acid. The same applies to a corresponding linkage to polyhydroxy compounds.

At least two groups containing active H atoms of the type

which are derived wholly or partly from methanetricarboxylic acid monoamide units of the formula (II) are present in the compound B).

Examples of suitable compounds B) are reaction products of malonic acid diesters, such as dimethyl, diethyl, dibutyl or dipentyl malonate, with monoisocyanates or polyisocyanates.

Examples of isocyanates of this type which can be employed in accordance with the invention are aliphatic isocyanates, such as n-butyl isocyanate or octadecyl isocyanate, cycloaliphatic isocyanates, such as cyclohexyl isocyanate, araliphatic isocyanates, such as benzyl isocyanate, or aromatic isocyanates, such as phenyl isocyanate, or polyisocyanates, such as tetramethylene diisocyanate, hexamethylene diisocyanate, 2,2,4-trimethtylhexamethylene diisocyanate, 1,12-dodecane diisocyanate, 1,3-cyclohexane diisocyanate, 1,4-cyclohexane diisocyanate, 1-isocyanato-3,3,5-trimethyl-5-isocyanatomethylcyclohexane (=isophorone diisocyanate, IPDI), perhydro-2,4'-diphenylmethane diisocyanate and/or perhydro-4,4'-diphenylmethane diisocyanate, 1,3-phenylene diisocyanate, 1,4-phenylene diisocyanate, 2,4-toluidine diisocyanate, 2,6-toluidine diisocyanate, 2,4'-diphenylmethane diisocyanate and/or 4,4'-diphenylmethane diisocyanate, 3,2'-diisocyanato-4-methyl-diphenylmethane and/or 3,4-diisocyanato-4-methyldiphenyl-methane, 1,5-naphthylene diisocyanate or 4,4',4''-triphenylmethane triisocyanate or mixtures of these compounds.

As well as these simple isocyanates, suitable isocyanates are also those containing hetero-atoms in the radical attached to the isocyanate groups. Examples of these are polyisocyanates containing carbodiimide groups, allophonate groups, isocyanurate groups, urethane groups, acylated urea groups and biuret groups.

The known polyisocyanates which are mainly employed in the preparation of lacquers are particularly suitable for the process according to the invention, for example modified products of the simple polyisocyanates mentioned above containing biuret, isocyanurate or urethane groups, in particular tris-(6-isocyanatohexyl)-biuret or low-molecular polyisocyanates containg urethane groups, such as can be obtained by reacting IPDI, employed in excess, with simple polyhydric alcohols having a molecular weight in the range of 62–300, in particular trimethylolpropane. It is of course also possible to employ any desired mixtures of the polyisocyanates mentioned for the preparation of the products according to the invention.

Suitable polyisocyanates are also the known prepolymers containing terminal isocyanate groups, such as are accessible, in particular, by reacting the abovementioned simple polyisocyanates, above all diisocyanates, with insufficient quantities of organic compounds containing at least two groups which are reactive toward isocyanate groups. Compounds of this type which can, in particular, be used are compounds in the molecular weight range of 300 to 10,000, preferably 400 to 6000, which contain a total of at least two amino groups and/or hydroxyl groups. It is preferable to use the corresponding polyhydroxy compounds, for example the hydroxypolyesters, hydroxypolyethers and/or hydroxyl group-containing acrylic resins which are known per se in polyurethane chemistry.

In these known prepolymers, the ratio of isocyanate groups to hydrogen atoms which are reactive toward NCO is 1.05 to 10:1, preferably 1:1 to 3:1, it being preferable for the hydrogen atoms to originate from hydroxyl groups.

It is, incidentally, preferable to select the nature and ratios of the starting materials employed in the preparation of the NCO prepolymers in such a way that the NCO prepolymers have a) an average NCO functionality of 2 to 4, preferably 2 to 3, and b) an average molecular weight of 500–10,000, preferably 800 to 4000.

Reaction products of esters and partial esters of polyhydric alcohols and malonic acid with monoisocyanates are also suitable, however, as compound B). Examples of polyhydric alcohols are dihydric to pentahydric alcohols, such as ethanediol, the various propanediols, butanediols, pentanediols and hexanediols, polyethylenediols and polypropylenediols, glycerol, trimethylolethane, trimethylolpropane, pentaerythritol, hexanetriol and sorbitol.

The compound B) can, in accordance with the invention, also be employed as a mixture with malonic esters of acrylic resins containing OH groups, polyesters, polyethers, polyester-amides and polyester-imides and/or reaction products of malonic acid half-esters, such as monoethyl malonate, with aliphatic and aromatic epoxide resins, for example acrylic resins containing epoxide groups, glycidyl ethers of polyols, such as hexanediol, neopentyl-gycol, diphenylolpropane and diphenylolmethane, and hydantoins containing glycidyl groups.

In the event that the groups (II) are present in an oligomer or polymer, that is to say the compound B) constitutes an oligomer or polymer, the amount of groups (II) is generally sufficiently large for the CH equivalent weight to be between 200 and 2000, preferably between 400 and 1800.

The invention also relates to a process for the preparation of curing products based on A) compounds having at least two $R^1R^2C{=}CR^3{-}X$ groups (I) and B) compounds having methanetricarboxamide units of the formula (II), these compounds B) containing at least two groups having active H atoms of the type

in which process the reaction of the components A) and B) is carried out in the presence of a catalyst with the formation of an oligomeric and/or polymeric reaction product.

This process can be carried out in a problem-free manner. Since it is preferable to use oligomeric and/or polymeric compounds A) and B) as starting materials, oligomeric and/or polymeric crosslinked reaction products are also obtained. In general, the curing reaction is carried out at $-10°$ to $180°$ C., preferably 0 to 100 and especially 20 to $80°$ C. For example, products of good hardness are obtained at room temperature after 2 to 24 hours or at $60°$ C. after 10 to 40 minutes.

Catalysts suitable for the process according to the invention are the catalysts known for the Michael addition reaction, in particular Lewis bases and Brönstedt bases.

Examples of suitable Lewis bases are amides, amidines, guanidines, such as N,N,N,N-tetramethylguanidine, and also 1,8-diazabicyclo[5.4.0]undec-7-ene, 1,5-diazabicyclo-[4.3.0]non-5-ene and 1,4-diazabicyclo[2.2.2]octane (DABCO), and also phosphanes (previously known as phosphines) and halides, in particular fluorides of quaternary ammonium compounds, such as alkylammonium, arylammonium and/or benzylammonium fluorides. In this respect, these halides can optionally be employed in combination with alkylsilicates in order to improve the activity of the catalyst even further. Individual examples which may be mentioned are alkylbenzyldimethylammonium fluorides, benzyltrimethylammonium fluoride and tetrabutylammonium fluoride.

Suitable phosphanes are, in particular, tertiary phosphanes of the general formula $P(CH_2{-}Y)_3$ in which the Ys are identical or different and denote the radical $-OH$, $-CH_2CN$ or $-N(Z)_2$, Z being an alkyl radical having 1 to 5 carbon atoms, such as tris-2-cyanoethylphosphane, trisdiethylaminomethylphosphane, preferably trishydroxymethylphosphane and trisdimethylaminomethylphosphane. Further suitable phosphanes are also tertiary phosphanes of the general formula $P(R^4,R^5,R^6)$ in which the radicals $R^4$, $R^5$ and $R^6$ denote an alkyl radical having 1 to 12 carbon atoms or a phenyl radical, unsubstituted or substituted by at least one alkyl, alkoxy or dialkylamino group having in each case 1 to 4 carbon atoms, and $R^4$, $R^5$ and $R^6$ are identical or different, at least one of the radicals representing a phenyl radical. Examples of these are triphenylphosphane, tris-p-tolylphosphane, tris-o-anisylphosphane, tris-p-dimethylaminophenylphosphane, phenyldi-p-anisylphosphane, phenyl-di-p-anisylphosphane, diphenyl-p-anisylphosphane, diphenyl-p-anisylphosphane, diphenyl-p-dimethylaminophenylphosphane, methyldiphenylphosphane, methyl-di-tolylphosphane, ethyl-di-p-anisylphosphane or (diethylaminomethyl)-diphenylphosphane, preferably tris-p-anisylphosphane, methyldiphenylphosphane and methyldi-p-anisylphosphane.

Phosphanes here should also be understood as meaning the iminophosphoranes of the general formula $(R^7, R^8, R^9)$ P=N—C $(R^{10}, R^{11}, R^{12})$ in which $R^7$, $R^8$ and $R^9$ are identical or different and denote an alkyl radical having 1 to 12 carbon atoms or an alkyl, alkoxy or dialkylamino group having in each case 1 to 4 carbon atoms in the alkyl radical, and $R_{11}$ and $R_{12}$ are identical or different and represent an alkyl radical having 1-5 carbon atoms or a phenyl radical. Examples of these are α,α-dimethylbenzylimino-tris-(dimethylamino)-phosphorane, α,α-dimethylbenzyliminomethyldiphenylphosphorane, t-butyliminotriphenylphosphorane and preferably α,α-dimethylbenzylimino-tributylphosphorane.

Examples which may be mentioned here of Brönstedt bases which can be employed as catalysts for the process according to the invention are alcoholates, in particular alkali metal alcoholates, such as lithiumbutylate, sodium methylate and potassium methylate and also quaternary ammonium compounds, such as alkylammonium arylammonium and/or benzylammonium hydroxides and carbonates. Special representatives of quaternary ammonium compounds in this regard are alkylbenzyldimethylammonium hydroxide (alkyl=$C_{16}$-$C_{22}$), benzyltrimethylammonium hydroxide and tetrabutylammonium hydroxide. The catalysts or catalyst mixtures mentioned can be used in the presence of tertiary aliphatic amines which are not per se effective at room temperature, such as, for example, triethylamine, N-methyldiethanolamine, N-methyldiisopropanolamine or N-butyldiethanolamine. These auxiliaries can be present to the extent of 0.1-5, preferably 0.1-1, % by weight.

In general, the amount of the catalyst is 0.01 to 5, preferably 0.02 to 2, % by weight, relative to the total solids content of the starting material. It can be varied, depending on the reactivity of the compounds A) and B) and the intended manner of carrying out the process.

The process according to the invention can be carried out in one stage, for example by working with equivalent amounts of the components. The pot life and the properties of the product therefore depend on the process conditions, i.e. on the nature and amount of the starting materials, the amount of catalyst added and the temperature control. Thus, the elasticity of the crosslinked product can be controlled within a tolerance range, for example by means of the chain length of the oligomers and/or polymers employed for A) or B).

Although the process according to the invention is as a rule operated discontinuously, it is also within the scope of the invention to carry out the mixing of the components and the reaction sequence continuously, for example by an automatic lacquering device.

The process according to the invention can be carried out in the presence or absence of organic solvents, which, in some cases, also exert an effect on the activity of the catalysts. Examples of suitable solvents are aromatic and aliphatic hydrocarbons, such as toluene, the various xylenes, mixtures of aliphatic and/or aromatic hydrocarbons, higher-boiling mineral oil fractions, esters, ethers, alcohols or the like.

All the reactants can be employed individually or as a mixture, provided that they are compatible with one another.

Although the process according to the invention is usually carried out under normal pressure, it can in individual cases be desirable to work under an elevated pressure in order to increase the rate of curing. The ratio of the reactants A) and B) to one another depends on the number of unsaturated groups I in compound A) and the sum of the active H atoms in compound B) (briefly described in the following text as "active double bonds: active H atoms"). In order to prepare the cross-linked end product, the said ratio of active double bonds: active H atoms is generally about 2:1 to 1:2, in particular about (0.8 to 1.2):1 to about 1:(0.8 to 1.2).

The reaction mixture is a two-component system which exhibits pot lives which vary between 5 minutes and about 12 hours, depending on the compound A) and B) chosen and on the nature and amount of the catalyst or combination of catalysts. A high degree of reliability in processing is thus ensured. By virtue of this advantageous property of the product, in conjunction with its rapid and satisfactory curing at room temperature or elevated temperatures and its resistance to chemicals, the product is excellently suitable for use as a binder for coatings.

The two-component systems are suitable for the preparation of shaped articles or can be applied as coatings to many kinds of substrates, for example to substrates of an organic or inorganic nature, such as wood, wood fiber materials, for example for sealing wood, textiles of natural or synthetic origin, plastics, glass, ceramics, building materials, such as concrete, fiber boards, artificial stone but particularly metal. The coatings can also be employed for household and industrial articles and equipment for example refrigerators, washing machines, electrical apparatus, windows, doors, furniture or the like. Application can be carried out by brushing, spraying, dipping or by electrostatic means.

A preferred embodiment of the invention is the preparation of coatings, preferably motor vehicle lacquers and, in particular, automobile repair lacquers. In this respect the resistance to xylene and, at the same time, a good resistance to premium gasoline are of particular interest. Since the 2-component system according to a preferred embodiment of the invention can cure itself at room temperature within a relatively short time without the liberation of environment-polluting substances, its use as an automobile repair lacquer is of considerable practical importance.

The two-component systems can, of course, also contain the customary additives, such as dyestuffs, pigments, fillers, plasticizers, stabilizers, leveling agents or neutralizing substances, such as tertiary amines and catalysts, which can be used in the customary amounts. These substances can be added to the individual components and/or to the total mixture.

The following are mentioned as examples of dyestuffs or pigments, which can be of an inorganic or organic nature: titanium dioxide, graphite, carbon black, zinc chromate, strontium chromate, barium chromate, lead chromate, lead cyanamide, lead silicochromate, calcium molybdate, manganese phosphate, zinc oxide, cadmium sulfide, chromium oxide, zinc sulfide, nickel titanium yellow, chromium titanium yellow, red iron oxide, black iron oxide, ultramarine blue, phthalocyanine complexes, naphthol red or the like.

The following are examples of suitable fillers: talc, mica, kaolin, chalk, powdered quartz, powdered asbestos, powdered slate, barium sulfate, various types of silica, silicates or the like.

The customary solvents are used for the fillers, for example aliphatic and aromatic hydrocarbons, ethers, esters, glycol ethers and esters thereof, ketones, chlorinated hydrocarbons, terpene derivatives, such as toluene, xylene, ethyl acetate, butyl acetate, ethylene glycol monoethyl ether-acetate, ethylene glycol monobutyl etheracetate, ethylene glycol dimethyl ether, diethylene glycol dimethyl ether, cyclohexanone, methyl ethyl ketone, acetone, isophorone or mixtures thereof.

In the instructions and examples below, % denotes % by weight in each case and parts denotes in each case parts by weight. Reduced pressure is to be understood in each case as the pressure of a water pump.

EXAMPLES

I) Preparation of the component A) (Michael acceptor) A 1) 1000 parts of an acrylic resin containing glycidyl groups, prepared from styrene glycidyl methacrylate and dimethylmaleate (epoxide equivalent weight 510), were dissolved in 680 parts of xylene at 70° C., and 127 parts of acrylic acid and 1 part of tetraethylammonium bromide were then added. Stirring was continued at 80°, while air was passed through, until an acid number of 1 was reached. The pale yellow solution had a solids content of 62.5%; C=C equivalent weight 1022.

A 2) 0.1 part of dibutyltin dilaurate and 50 parts on n-butyl isocyanate were added to 570 parts of the resin solution from Example A 1. Stirring was continued for 4 hours at 60° C. (NCO value 0.2%). Solids content 65%; C=C equivalent weight 1112.

A 3) 657 parts of a melamine resin of the hexamethoxymethylmelamine type (molecular weight 399), 1053 parts of 2-hydroxyethyl acrylate, 3.3 parts of hydroquinone monomethyl ether and 1.65 parts of sulfuric acid were initially placed in a three-necked flask equipped with a stirrer, a thermometer and a distillation column with a descending condenser. The mixture was heated to 75° C. unter reduced pressure and was heated to 95° C. in the course of 4 hours. After cooling to room temperature it was neutralized with 10 parts of 10% strength methanolic potassium hydroxide solution and filtered. 1410 parts of a low-viscosity clear resin were obtained, C=C equivalent weight 175.

A 4) 500 parts of isophorone diisocyanate were dissolved in 190 parts of xylene and heated to 40° C. and, after 0.8 part of zinc acetylacetonate and 3.8 parts of hydroquinone monomethyl ether had been added, 261 parts of 2-hydroxyethyl acrylate were added in the course of 2 hours. When the theoretical isocyanate content had been reached, the mixture was heated to 60° C. and 101 parts of trimethylolpropane were added in portions, and the mixture was stirred until an N=C=O content of 0.3% had been reached. It was then diluted with xylene to a solids content of 60%. Yield 1045 parts. C=C equivalent weight 640.

II) Preparation of the component B) (Michael donor)

B 1) 103 parts of 2,2,4-trimethylhexamethylene 1,6-diisocyanate were metered in at room temperature and in the course of 90 minutes to a mixture of 132 parts of dimethylmalonate, 59 parts of xylene and 0.5 part of sodium methylate. When the addition was complete, stirring was continued at 60° C. until the content of free N=C=O groups had reached 0.5%, and 285 parts of a clear, pale yellow resin solution were obtained after filtration. Solids content 80%. C—H equivalent weight: 290.

B 2) 190 parts of an isocyanurate polyisocyanate (N=C=O content 21%) obtained by trimerization of hexamethylene diisocyanate were added dropwise at room temperature to a mixture of 160 parts of diethylmalonate and 0.7 part of sodium methylate. When the dropwise addition was complete, stirring was continued at 60° C. until the content of free N=C=O groups had reached 0.5%. The resin was dissolved in 88 parts of diglycol dimethyl ether, and the solution was filtered. Yield 420 parts, solids content 80%, C—H equivalent weight: 420.

B 3) 190 parts of an isocyanurate polyisocyanate (N=C=O content: 21%) obtained by trimerization of hexemethylene diisocyanate were added at 60° C. to 216 parts of dibutyl malonate and 1 part of sodium methylate. When the conxylene were added and the mixture was filtered. Yield 570 parts, solids content 70%. C—H equivalent weight: 555.

B 4) 40.2 parts of trimethylolpropane and 288 parts of diethylmalonate were heated at 170° C. under nitrogen as a protective gas in an apparatus equipped with a stirrer, a thermometer and a descending condenser. 31 parts of ethanol were distilled off at 160°-170° C. in the course of 5 hours, and, after cooling to 120° C., low-boiling constituents were removed from the reaction mixture under a reduced pressure of 4 hPa. The temperature of the reaction mixture was reduced further to 80° C., 1.5 parts of sodium methylate and, in the course of 1 hour, 100 parts of cyclohexyl isocyanate were added, and the mixture was stirred further at this temperature until the isocyanate content had reached 0.4%, whereby 300 parts of a pale yellow, viscous liquid were obtained. C—H equivalent weight: 240.

B 5) 335 parts of tirmethylolpropane and 2400 parts of diethylmalonate were heated at 150° to 170° C. in the same apparatus as in B 4. When the removal of ethanol by distillation was complete, the excess diethylmalonate was distilled off under reduced pressure at 150° to 160° C.

1201 parts of a colorless liquid were left as residue. C—H equivalent weight 79.

IV) Preparation of coatings—Examples 1 to 14

The amounts by weight of the components A) and B) indicated in the table below were mixed in equimolar amounts. The comparison substance used was a copolymer prepared from 31 parts of glycidyl methacrylate, 15 parts of dimethylmaleate and 54 parts of styrene, diethylenetriamine being employed as the curing agent for this system. After the catalyst indicated had been mixed in, the resulting coating material was applied to glass sheets in a wet film thickness of 100 μm by means of an applicator doctor-blade and was cured at room temperature or at 80° C. (30 minutes).

The abbreviations used in the tables below have the following meanings:

HC: hot curing = 30 minutes at 80° C.
RT: room temperature
TMPTA: trimethylolpropane trisacrylate MDPP: methyldiphenylphosphane
MDTP: methyldi-p-tolylphosphane
MDPAP: methyldi-p-anisylphosphane
DBU: 1,8-diazabicyclo[5.4.0]undec-7-ene
DBN: 1,5-diazabicyclo[4.3.0]non-5-ene
TMG: N,N,N',N'-tetramethylguanidine
DABCO: 1,4-diazabicyclo[2.2.2]octane
i.o.: no injury to the lacquer film discernible
DETA: diethylenetriamine

TABLE

| | | | | | | | | | König pendulum hardness (s) | | Resistance (after 10 days) to: | |
|---|---|---|---|---|---|---|---|---|---|---|---|---|
| | Component A | | Component B | | Catalyst | | Pot life | Curing tempera- | after | | premium grade | |
| Example | Type | Amount | Type | Amount | Type | Amount | (h) | ture | 1 day | 10 days | gasoline | Xylene |
| 1 | TMPTA | 10 | B2 | 42 | MDPP | 0.22 | 8 | RT | 100 | 171 | i.o. | >1 h |
| 2 | TMPTA | 5 | B3 | 28 | DBU | 0.12 | 4 | RT | 92 | 159 | i.o. | >1 h |
| 3 | TMPTA | 5 | B3 | 28 | DBN | 0.05 | 6 | Hc | 128 | 164 | i.o. | >1 h |
| 4 | A1 | 31 | B1 | 9 | TMG | 0.13 | 7 | Hc | 123 | 175 | i.o. | >1 h |
| 5 | A1 | 31 | B1 | 9 | MDTP | 0.13 | 9 | RT | 78 | 170 | i.o. | >1 h |
| 6 | A1 | 31 | B2 | 13 | MDPAP | 0.13 | 12 | Hc | 115 | 181 | i.o. | >1 h |
| 7 | A2 | 34 | B2 | 13 | MDPP | 0.16 | 14 | Hc | 104 | 201 | i.o. | >1 h |
| 8 | A2 | 34 | B3 | 16 | DABCO | 0.07 | 12 | RT | 84 | 190 | i.o. | >1 h |
| 9 | A3 | 18 | B1 | 30 | TMG | 0.21 | 8 | RT | 101 | 195 | i.o. | >1 h |
| 10 | A3 | 9 | B3 | 28 | DBU | 0.06 | 9 | RT | 98 | 182 | i.o. | >1 h |
| 11 | A4 | 32 | B1 | 15 | DBN | 0.06 | 10 | RT | 94 | 174 | i.o. | >1 h |
| 12 | A4 | 32 | B2 | 21 | MDTP | 0.18 | 11 | Hc | 126 | 192 | i.o. | >1 h |
| 13 | A1 | 31 | B4 | 7 | DBU | 0.13 | 8 | RT | 102 | 174 | i.o. | >1 h |
| 14 | A1 | 62 | B2 / B4 | 13 / 7 | MDTP | 0.28 | 11 | Hc | 126 | 184 | i.o. | >1 h |
| 15 | A1 | 62 | B4 / B5 | 7 / 2.5 | TMG | 0.24 | 12 | RT | 104 | 174 | i.o. | >1 h |
| A* | — | 45.8 | DETA | 2.1 | — | — | 24 | RT | 65 | 117 | | 10 min |
| B* | — | 45.8 | DETA | 2.1 | — | — | 24 | Hc | 132 | 142 | | 50 min |

*comparison examples

We claim:

1. A curable mixture containing A) compounds having at least two $R^1R^2C=C^3-X$ groups (I) and B) compounds having at least two groups of the formula

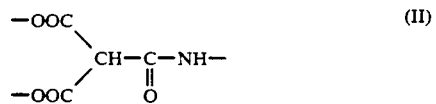

(II)

which are the reaction products of malonic acid diesters with mono- or polyisocyanates X is —CO—, $R^1$ is hydrogen or a hydrocarbon radical having 1 to 10 carbon atoms, $R^2$ is hydrogen, alkyl of 1 to 10 carbon atoms, —CN, —$NO_2$ or a —CO—$NHR^1$—or —CO—$R^1OCOR^4$ group, $R^4$ is alkyl of 1 to 12 carbon atoms and the $R^3$ having the same meaning as the $R^2$ and may be different therefrom.

2. A curable mixture as claimed in claim 1, wherein $R^1$, $R^2$ and $R^3$, in the formula (I) denote a hydrocarbon radical having 1 to 4 carbon atoms.

3. A curable mixture as claimed in claim 1, wherein the radical $R^1R^2C=CR^3-X$ (I) is a monounsaturated or polyunsaturated carboxylic acid which is not more than dibasic and has 2 to 10 carbon atoms.

4. A curable mixture as claimed in claim 3, wherein the carboxylic acid is acrylic acid, methacrylic acid and/or maleic acid.

5. A curable mixture as claimed in claim 1, wherein the groups (I) in the compounds A) are attached to the radical of a polyol or polyamine.

6. A curable mixture as claimed in claim 1, wherein the compound A) is a polyester containing OH groups, a copolymer containing OH groups, a copolymer containing epoxide groups or an epoxide resin and/or amine resin.

7. A curable mixture as claimed in claim 6, wherein the copolymer containing OH groups has an OH number of 40–250.

8. A curable mixture as claimed in claim 6, wherein the copolymer containing epoxide groups containing 1 to 10% of epoxide oxygen.

9. The two-component lacquer based on A) compounds having at least two $R^1R^2C=CR^3-X$ groups (i) with $R^1$, $R^2$ and $R^3$ and X being defined as in claim 1 and B) compounds having at least two groups of the formula

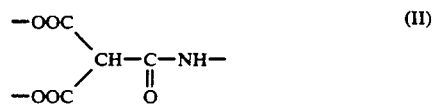

(II)

which are reaction products of malonic acid diesters with mono- or polyisocyanates on its own or in combination with lacquer additives.

* * * * *